United States Patent
Lee et al.

(10) Patent No.: US 7,380,142 B2
(45) Date of Patent: May 27, 2008

(54) APPARATUS FOR CONTROLLING STANDBY POWER

(75) Inventors: Jeong-Soo Lee, Bucheon-Si (KR); Chan-Dong Kim, Seoul (KR)

(73) Assignee: Inca Solution Co., Ltd., Samjeong-Dong, Ojeong-Gu, Bucheon-Si, Gyeonggi-Do (KR)

( * ) Notice: Subject to any disclaimer, the term of this patent is extended or adjusted under 35 U.S.C. 154(b) by 535 days.

(21) Appl. No.: 11/037,902

(22) Filed: Jan. 18, 2005

(65) Prior Publication Data

US 2006/0101294 A1    May 11, 2006

(30) Foreign Application Priority Data

Nov. 10, 2004    (KR)    ............ 10-2004-0091564

(51) Int. Cl.
  *G06F 1/00* (2006.01)
  *G06F 1/26* (2006.01)
  *G06F 1/32* (2006.01)

(52) U.S. Cl. .............. 713/300; 713/320; 713/324; 713/340

(58) Field of Classification Search ........... 713/300, 713/320, 324, 340
See application file for complete search history.

(56) References Cited

U.S. PATENT DOCUMENTS

| | | | | |
|---|---|---|---|---|
| 4,312,035 A | * | 1/1982 | Greene | 713/324 |
| 5,408,668 A | * | 4/1995 | Tornai | 713/324 |
| 5,408,669 A | * | 4/1995 | Stewart et al. | 713/300 |
| 5,477,476 A | * | 12/1995 | Schanin et al. | 713/324 |
| 5,524,249 A | * | 6/1996 | Suboh | 713/322 |
| 5,669,004 A | * | 9/1997 | Sellers | 713/324 |
| 5,721,934 A | * | 2/1998 | Scheurich | 713/320 |
| 5,790,873 A | * | 8/1998 | Popper et al. | 713/300 |
| 5,799,198 A | * | 8/1998 | Fung | 713/323 |
| 5,835,083 A | * | 11/1998 | Nielsen et al. | 345/211 |
| 5,848,281 A | * | 12/1998 | Smalley et al. | 713/322 |
| 5,911,079 A | * | 6/1999 | Yang et al. | 713/300 |
| 6,065,125 A | * | 5/2000 | Shiell et al. | 713/330 |
| 6,122,745 A | * | 9/2000 | Wong-Insley | 713/300 |
| 6,266,776 B1 | * | 7/2001 | Sakai | 713/300 |
| 6,282,655 B1 | * | 8/2001 | Given | 726/34 |

(Continued)

FOREIGN PATENT DOCUMENTS

DE    29802336 U1    *    7/1998

*Primary Examiner*—Mark Connolly
(74) *Attorney, Agent, or Firm*—G W i P S

(57) ABSTRACT

A standby power control apparatus is developed for monitoring the peripheral devices connected to a computer and the current computer status. A power-supply voltage applied to the peripheral devices and the computer can be completely blocked depending on the result of the monitoring. The standby power control apparatus is comprised of: a power-supply unit, interface unit, I/O terminal unit for transmitting the input signals received from a mouse or keyboard to the microprocessor, a switching unit, an individual load detector for detecting the load of a peripheral device, a sensor for determining the user status, a microprocessor for actuating the switching unit according to first to third input signals to control the voltage generated from the sockets, an individual drive signal generator for generating a drive signal to switch the switching unit; and a monitoring/management unit for transmitting a power-supply control command signal to the microprocessor, and providing the various administrator setup menus.

9 Claims, 3 Drawing Sheets

U.S. PATENT DOCUMENTS

| | | | |
|---|---|---|---|
| 6,308,278 B1* | 10/2001 | Khouli et al. | 713/323 |
| 6,330,676 B1* | 12/2001 | Kelsey | 726/7 |
| 6,367,020 B1* | 4/2002 | Klein | 726/26 |
| 6,418,536 B1* | 7/2002 | Park | 713/323 |
| 6,665,805 B1* | 12/2003 | Tsirkel et al. | 713/323 |
| 6,734,845 B1* | 5/2004 | Nielsen et al. | 345/211 |
| 6,735,705 B1* | 5/2004 | Egbert et al. | 713/300 |
| 7,080,268 B2* | 7/2006 | Mosley | 713/320 |
| 2004/0218411 A1* | 11/2004 | Luu et al. | 363/146 |

* cited by examiner

APPARATUS FOR CONTROLLING STANDBY POWER

BACKGROUND OF THE INVENTION

1. Field of the Invention

The present invention relates to an apparatus for controlling standby power, and more particularly to a standby power controller for monitoring individual states of peripheral devices connected to a computer and a current state of the computer, and completely blocking a power-supply voltage from being applied to the peripheral devices and the computer according to the monitoring result, such that it blocks the occurrence of standby power.

2. Related Prior Art

Recently, a variety of power-saving electric appliances have been increasingly developed to accomplish energy-saving and environment-protection purposes, such that they have been widely used throughout the world. As a variety of power-saving electronic fluorescent lamps using a power semiconductor have rapidly come into widespread use in the Republic of Korea since the beginning of the 1990's, a high power-saving effect has been established in an illumination field. A plurality of countries have divided an energy efficiency grade of electric appliances into first to fifth energy efficiency grades to allow such energy-saving appliances to come into widespread use.

The most important matter to determine the above-mentioned energy efficiency grade is standby power.

For example, a TV using a remote-controller is called a preheater, and is designed to immediately display a screen image in response to a switching-ON signal or to consume remote-control power, such that it unavoidably consumes power on the condition that a user does not take a TV plug out of a wall although the user turns off the TV.

The amount of standby power occupies about 11% of total household power consumption according to academic research. In the case of reducing the amount of standby power, annual energy costs can be reduced by about 33,000 won for each household, and annual energy costs can be reduced by about 500 billion Won in whole country as a whole. In the case of OECD member countries, the amount of power of about 10%~15% of average household power consumption has been consumed as annual standby power, such that unnecessary consumption of standby power has been considered to be the most serious problem of power consumption in the world.

The above-mentioned standby power has been unfavorably named "Power Vampire" by public opinion organizations in the United States since the occurrence of the California power crisis in 2001. The US government has announced the Presidential Order dictating that products which do not satisfy the requisite 1-Watt standby power shall be excluded from governmental procurement.

European Union (EU) has established a standby power reference by announcing the Power Efficiency Principles in Brussels. The Japanese Government has also established a variety of rules associated with standby power, such that it has increasingly concentrated upon development of improved standby power technologies in conjunction with associated enterprises.

In the meantime, with the increasing development of computers and the widespread of multimedia, a plurality of peripheral devices is connected to the computers for use in individual households and offices. For example, a plurality of peripheral devices, for example, a monitor, a speaker, a printer, a scanner, and a PC camera, etc., are generally connected to a single computer. In order to supply a power-supply voltage to the computer and the peripheral devices, a multi-consent for use in the computer is generally used.

However, the peripheral devices are used by only a user command generated when a computer main body is currently operated, such that the user must directly power off individual devices when the computer is not in use, resulting in greater inconvenience of use. For example, if a plug of the computer is connected to the socket although the computer is powered off, i.e., in the case of a standby time, or if the computer or a specific peripheral device is not in use for a long period of time on the condition that the computer is powered on, i.e., in the case of an idle time, the user must directly power off individual devices. The amount of power consumed for the idle time is greater than that consumed for the standby time, such that it is considered to be a very serious problem.

In order to reduce the amount of power consumption during the standby time, a first method for mounting a manually-operable switch to the multi-consent to control power on/off operations, and a second method for detecting a current of a power-supply voltage transmitted from a computer socket to a computer main body, and blocking peripheral devices from receiving a power-supply voltage when the computer is powered off are well known in the art. A representative example is described in Korean Utility Model Registration No. 20-218843, issued on 19 Jan. 2001, entitled "Power-Saving Multi-Consent", which is hereby incorporated by reference. Korean Utility Model Registration No. 20-218843 describes a method for detecting on/off states of a computer according to a current detection scheme, and blocks a power-supply voltage from being applied to peripheral devices when the computer is powered off.

However, in the case of the idle time, i.e., in the case where a computer or specific peripheral device is not in use for a long period of time on the condition that a user powers on the computer, there is no solution to accomplish the power-saving effect.

SUMMARY OF THE INVENTION

Therefore, the present invention has been made in view of the above problems, and it is an object of the present invention to provide a standby power control device for monitoring state information of peripheral devices connected to a computer and a current state of the computer, and controlling power-supply voltages of the peripheral devices and the computer according to the monitoring result, such that it reduces the amount of power consumed for an idle time during which a user does not actually use the computer and at least one peripheral device due to his or her mealtime, conference, settlement, and outing, etc. after the computer and the peripheral devices are powered on, and reduces power consumption of the remaining unused peripheral devices even when one or more peripheral devices are used, resulting in the implementation of complete power-saving effect.

It is another object of the present invention to provide a standby power control device for efficiently reducing the amount of standby power (i.e., power consumption generated when a plug is connected to a socket although the computer is powered off) of a computer and its peripheral devices on the condition that a user powers off the computer to leave his or her office or to sleep.

In accordance with the present invention, the above and other objects can be accomplished by the provision of a standby power control apparatus for use in a power control device for controlling a power-supply voltage of a computer system including a computer and a monitor, and controlling power-supply voltages of peripheral devices, for example, a printer, a scanner, a speaker, and a personal computer (PC) camera, etc., the apparatus comprising: a power-supply unit for converting a commercial power source to a DC power-supply voltage requisite for the system, and providing individual components with necessary power-supply voltages; an interface unit being connected to the computer via a communication line, and interfacing a signal transmitted from the computer; an I/O terminal unit being connected to a mouse and a keyboard of the computer, and transmitting input signals received from the mouse and the keyboard to a microprocessor; a switching unit for connecting a plurality of switches to a plurality of sockets, respectively, switching the switches according to an external control signal, and recovering or blocking power-supply voltages applied to the sockets; an individual load detector for receiving power-supply state information from the switching unit, and detecting load information of the peripheral device on the basis of the received power-supply state information; a sensor being mounted to one side of the computer or the monitor, and determining the presence or absence of a user; a microprocessor for receiving a first input signal from the computer via the interface unit, a second input signal from the mouse and the keyboard via the I/O terminal unit, and a third input signal from the individual load detector and the sensor, switching the switching unit according to the received first to third input signals, and controlling a power-supply voltage generated from the sockets; an individual drive signal generator for receiving a control command signal from the microprocessor, and generating a drive signal to switch on or off the switches of the switching unit; and a monitoring/management unit for determining whether the computer, the monitor, and the peripheral device are actually used, transmitting a power-supply control command signal to the microprocessor via the interface unit according to the determined result, and being installed in the computer in the form of an application program, such that it provides the user with a variety of administrator setup menus to allow the user to control overall operations of the system using the administrator setup menus.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
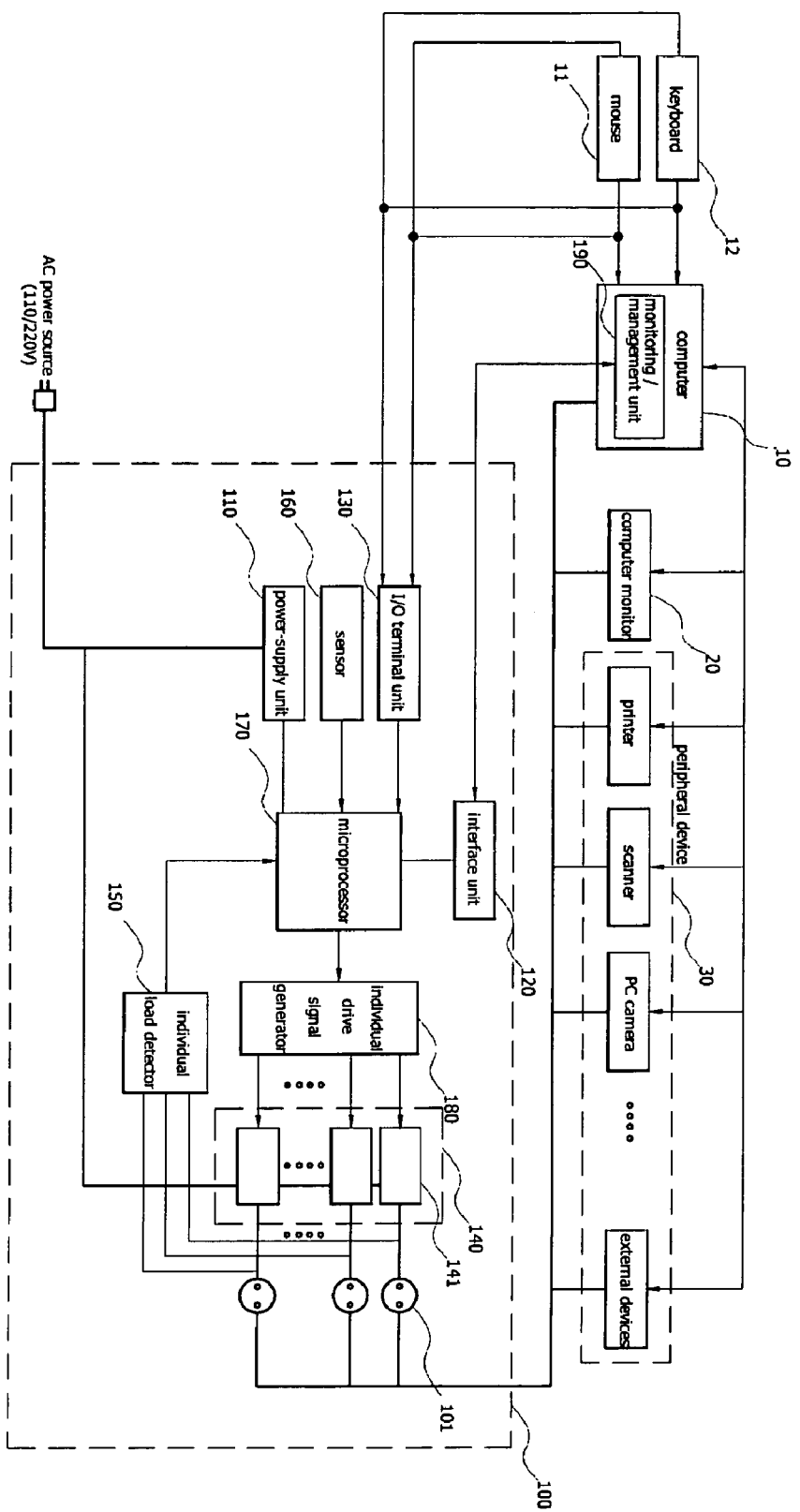
FIG. 1 is a block diagram illustrating a standby power control device according to the present invention.

Now, preferred embodiments of the present invention will be described in detail with reference to the annexed drawings. In the drawings, the same or similar elements are denoted by the same reference numerals even though they are depicted in different drawings. In the following description, a detailed description of known functions and configurations incorporated herein will be omitted when it may make the subject matter of the present invention rather unclear.

FIG. 1 is a block diagram illustrating a standby power control device according to the present invention.

Referring to FIG. 1, the standby power control device 100 according to the present invention includes a power-supply unit 110, an interface unit 120, an Input/Output (I/O) terminal unit 130, a switching unit 140, a detector 150 for detecting individual load (hereinafter referred to as an individual load detector), a sensor 160, a microprocessor 170, an output unit 180 for generating individual drive signals (hereinafter referred to as an individual drive signal generator), and a monitoring/management unit 190.

The power-supply unit 110 converts an 110V or 220V commercial power source to a DC power-supply voltage requisite for a system, and provides individual components with necessary power-supply voltages. The power-supply unit 110 includes a rectifier circuit (not shown) for rectifying an AC voltage to a DC voltage, and a constant-voltage circuit (not shown) for converting the DC voltage generated from the rectifier circuit into a constant DC voltage. Also, the power-supply unit 110 may receive a DC voltage from either the interface unit 120 or the computer 10.

The interface unit 120 is connected to the computer via a communication line, and interfaces a signal transmitted from the computer 10. In this case, the interface unit 120 supports a variety of communication schemes, for example, USB (Universal Serial Bus), PS2, and RS232, etc.

The I/O terminal unit 130 is connected to a mouse 11 and a keyboard 12 of the computer 10, and transmits input signals received from the mouse 11 and the keyboard 12 to the microprocessor 170. In more detail, the I/O terminal unit 130 includes PS2 and USB ports to interconnect the mouse 11 and the keyboard 12, a PS2 port connected to a PS2 port of the computer 10, and an USB port connected to an USB port of the computer 10.

The switching unit 140 connects a plurality of switches 141 such as relays to a plurality of sockets 101, respectively. The switches 14 are switched by a drive signal of the output unit for generating individual drive signals, and recover or block a commercial power source applied to individual sockets 101. In this case, the socket 101 includes designated addresses for every peripheral device such that the microprocessor 170 independently controls the computer 10, a computer monitor 20, and a peripheral device 30. A commercial power source is applied to the switches 141 via individual sockets 101.

The individual load detector 150 receives power-supply state information from the switching unit 140, and detects load information of the peripheral device 30 on the basis of the received power-supply state information. In this case, a user may monitor whether the system is normally operated on the basis of the amount of load detected by the individual load detector 150.

The sensor 160 is mounted to one side of the computer 10 or the monitor 20 to determine the presence or absence of a user. In this case, a variety of sensors may be used as the sensor 160, for example, a thermal sensor, an optical sensor, a contact sensor, and an acoustic sensor, etc.

The microprocessor 170 receives a first input signal from the computer 10 via the interface unit 120, a second input signal from the mouse 11 and the keyboard 12 via the I/O terminal unit 130, and a third input signal from the individual load detector 150 and the sensor 160, and switches the switching unit 140 according to the received first to third input signals, such that it controls a power-supply voltage generated from the sockets 101. In this case, if the microprocessor 170 receives a first power-supply control command, a second power-supply control command, or a third power-supply control command, it selectively recovers a power-supply voltage of the computer monitor 20 or the peripheral device 30 or simultaneously recovers the power-supply voltages of the computer monitor 20 and the peripheral device 30 according to the received power-supply control command information. In this case, the first power-supply control command is adapted to selectively recover a power-supply voltage of the computer monitor 20 or the peripheral device 30 or simultaneously recover power-supply voltages of the computer monitor 20 and the peripheral device 30 on the condition that the microprocessor 170 receives power-supply recovery commands of the computer monitor 20 and the peripheral device 30 from the monitoring/management unit 190 via the interface unit 120 after the computer monitor 20 and the peripheral device 30 are powered off. The second power-supply control command is adapted to recover a power-supply voltage of a specific peripheral device on the condition that the microprocessor 170 determines whether the specific peripheral device is used after recognizing used state information of the computer monitor 20 and the peripheral device 30 in real time. The third power-supply control command is adapted to recover power-supply voltages of the computer monitor 20 and the peripheral device 30 by allowing the microprocessor 170 to determine whether an input signal is generated from the mouse 11 or the keyboard 12.

In the case of the following first to fourth cases, the microprocessor 170 blocks a power-supply voltage from being applied to the computer 10, the monitor 20, and the peripheral device 30. In the first case, a system of the computer 10 is terminated such that the monitoring/management unit 190 does not generate a response signal at least predetermined number of times. In the second case, there is no input signal from the mouse 11 and the keyboard 12 during at least a predetermined time. In the third case, when the individual load detector 150 detects the amount of load of the computer 10, the computer monitor 20, or the peripheral device 30, it is determined that the detected load is less than a predetermined amount of load. In the fourth case, a user is not detected by the sensor 160 during at least a predetermined time.

If the user generates an input signal using the keyboard 12 or the mouse 11 on the condition that the computer 10, the computer monitor 20, and the peripheral device 30 are powered off, or if the presence of the user is detected by the sensor 160, the microprocessor 170 recovers power-supply voltages of the computer 10, the monitor 20, and the peripheral device 30.

The microprocessor 170 provides the computer 10 with only standby power when the presence of the user is detected by the sensor 160 on the condition that the computer 10 is powered off.

The individual drive signal generator 180 receives a control command signal from the microprocessor 170, and outputs a drive signal to switch on or off the switches 141 of the switching unit 140.

The monitoring/management unit 190 determines whether the computer 10 is actually used or the peripheral device 30 is actually used, outputs a signal to the microprocessor 170 via the interface unit 120 according to the determined result. The monitoring/management unit 190 is installed in the computer 10 in the form of an application program, such that it provides a user with a variety of administrator setup menus to allow the user to control overall operations of the system using the administrator setup menus. In this case, the monitoring/management unit 190 includes address information when a power-supply control command is transmitted to the microprocessor 170.

If the monitoring/management unit 190 transmits a first power-supply control command, a second power-supply control command, a third power-supply control command, or a fourth power-supply control command. In this case, the first power-supply control command is adapted to selectively or simultaneously block power-supply voltages of the peripheral device 30 when a user enters a power-supply blocking command of the peripheral device 30. The second power-supply control command is adapted to block a power-supply voltage from being applied to a specific peripheral device on the condition that used state information of the peripheral device 30 is recognized in real time and the specific peripheral device is in an idle state during a predetermined period. The third power-supply control command is adapted to block a power-supply voltage from being applied to a corresponding peripheral device when a user manually powers off the corresponding peripheral device. The fourth power-supply control command is adapted to block a power-supply voltage from being applied to the peripheral device 30 if the monitoring/management unit 190 receives no input signal from the mouse 11 or the keyboard 12 during at least a predetermined time.

Contrary to the above-mentioned cases, the monitoring/management unit 190 generates a first power-supply control command to selectively or simultaneously recover power-supply voltages of the peripheral device 30 when a user enters a power recovery command of the peripheral device 30 using menu information. Also, the monitoring/management unit 190 generates a second power-supply control command such that it recognizes used state information of the peripheral device 30 in real time, determines whether a specific peripheral device is used, and recovers a power-supply voltage applied to the specific peripheral device. The monitoring/management unit 190 generates a third power-supply control command such that it determines whether an input signal is generated from the mouse 11 or the keyboard 12, recovers a power-supply voltage of the peripheral device 30 or selectively recovers only power-supply voltages of an unused peripheral device other than the used peripheral device 30. In the case of recovering a power-supply voltage of the peripheral device 30, the monitoring/management unit 190 displays a message indicative of a power-supply recovery on the computer monitor 20 until the peripheral device 30 recovers its power-supply voltage in a warm-up state.

Also, if the monitoring/management unit 190 transmits a first power-supply control command, a second power-supply control command, a third power-supply control command, a fourth power-supply control command, or a fifth power-supply control command. In this case, the first power-supply control command is adapted to block a power-supply voltage of the computer monitor 20 upon receiving a power-supply blocking command of the computer monitor 20 from a user. The second power-supply control command is adapted to block a power-supply voltage from being applied to the computer monitor 20 on the condition that used state information of the computer monitor 20 is recognized in real time and the computer monitor 20 is in an idle state during a predetermined period. The third power-supply control command is adapted to block a power-supply voltage from being applied to the computer monitor 20 when a user powers off the computer monitor 20. The fourth power-supply control command is adapted to block a power-supply voltage from being applied to the computer monitor 20 when there is no input signal from the mouse 11 or the keyboard 12 during at least a predetermined time. The fifth power-supply control command is adapted to block a power-supply voltage from being applied to the computer monitor 20 if a screen saver or a monitor-off operation is activated according to power-supply setup information of the monitor 20 from among power-supply option information of the computer system.

Also, the monitoring/management unit 190 monitors state information of the computer 10 on the condition that the peripheral device 30 is powered off, generates a command for storing all current tasks if the computer 10 is in an unused state (e.g., no download, no file transmission, inactive program state, no data transmission to peripheral devices, etc.), stores the current tasks, and terminates the system. In this case, the monitoring/management unit 190 turns off an HDD or activates a system standby mode according to power-supply option information of a computer system before the system is terminated. Also, the monitoring/management unit 190 monitors state information of the computer 10 during a predetermined time, and terminate the system if the computer 10 is continuously in the unused state.

Operations of the standby power control device according to the present invention will hereinafter be described with reference to FIGS. 1 to 3.

Figure 2:
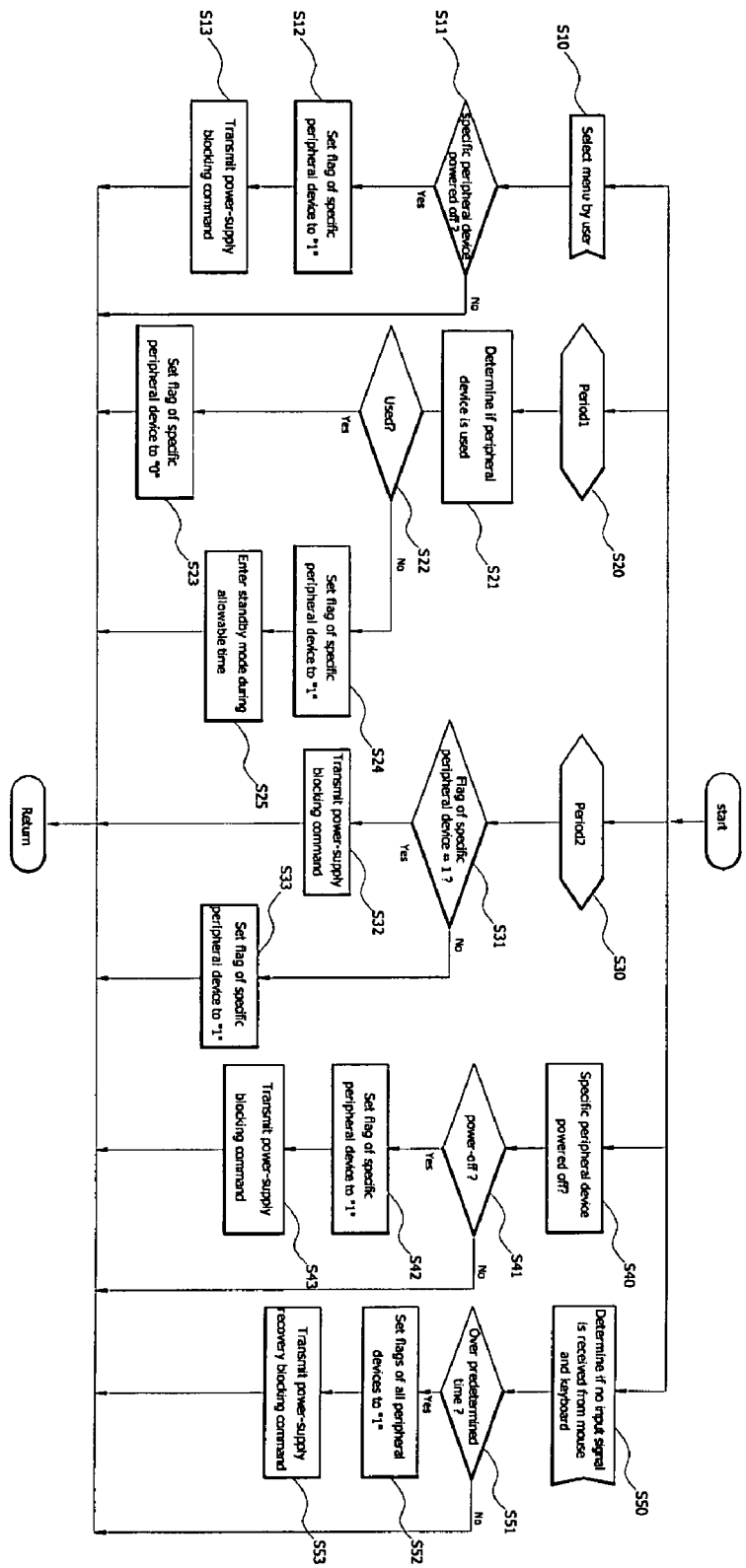
FIG. 2 is a flow chart illustrating a power control method for use in a monitoring/management unit contained in the standby power control device of FIG. 1 according to the present invention.
Figure 3:
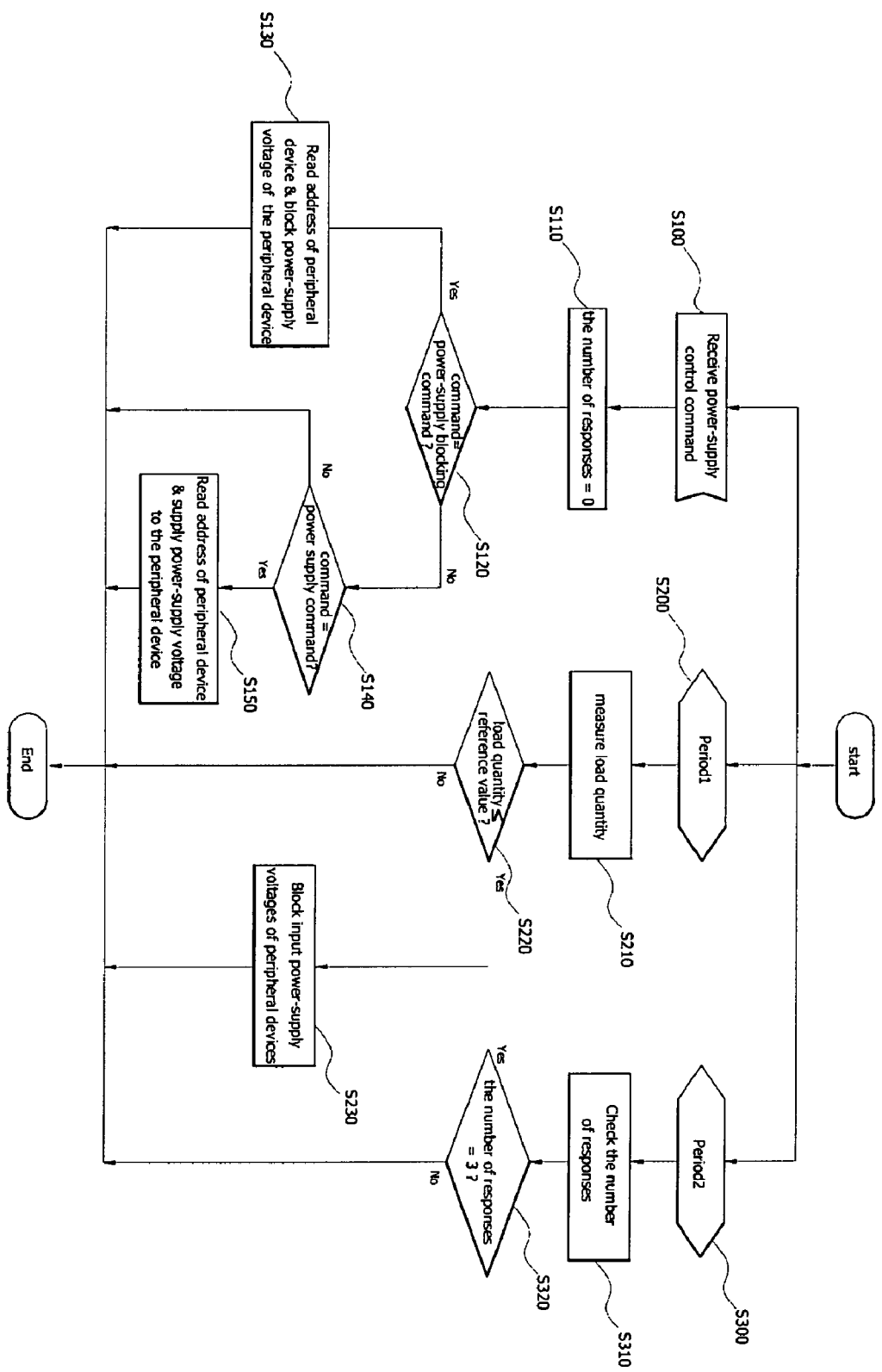
FIG. 3 is a flow chart illustrating a power control method for use in a microprocessor contained in the standby power control device of FIG. 1 according to the present invention.

FIG. 2 is a flow chart illustrating a power control method for use in the monitoring/management unit contained in the standby power control device of FIG. 1 according to the present invention, and FIG. 3 is a flow chart illustrating a power control method for use in the microprocessor contained in the standby power control device of FIG. 1 according to the present invention.

Prior to describing the present invention, the term "System Termination" or "Power-Off state" is indicative of a specific state during which system operations are completely halted by a user who presses a power button of the system. In the case of the system termination or the power-off state, standby power is left in the system, resulting in the occurrence of power consumption. And, the other term "Power-Supply Blocking State" is indicative of a specific state during which an input power source of the system is completely blocked, such that there is no power consumption during the power-supply blocking state. In other words, the power-supply blocking state corresponds to an unplugged state.

Device Address Setup

Individual sockets 101 contained in the standby power control device 100 include unique designated addresses, respectively. Individual sockets 101 include predetermined labels such that they are connected to individual plugs of unique peripheral devices 30, for example, a computer monitor 20, a speaker, and a printer, etc. If a plug of one of the peripheral devices 30 is connected to a corresponding socket, an address of the peripheral device 30 is determined. This address determination of the peripheral device 30 is called a "default setup". In the meantime, provided that a user desires to freely establish an address of a specific peripheral device, the user may re-establish the address of the peripheral device 30 using the monitoring/management unit 190.

Method for Controlling Power-Supply Voltage of Peripheral Device Using Monitoring/Management Unit The computer 10, the computer monitor 20, and the peripheral device 30 are connected to their designated sockets 101, respectively. The switching unit 140 is switched on to power on the computer 10, the computer monitor 20, and the peripheral device 30, and the computer 10 is booted, such that the system starts its operation.

Under the above-mentioned situation, if a user selects a corresponding option menu to block a power-supply voltage from being applied to a specific peripheral device or all peripheral devices using the monitoring/management unit 190 at step S10, as shown in FIG. 2, the monitoring/management unit 190 determines which one of peripheral devices receives a power-supply blocking command at step S11, determines a flag of a corresponding peripheral device to be "1" at step S12, and transmits an address of a corresponding peripheral device and a signal including a power-supply control command for blocking a power-supply voltage to the microprocessor 170 at step S13.

The monitoring/management unit 190 recognizes used state information of the peripheral device 30 in real time during a first period "Period1" at steps S20 and S21, and determines whether a specific peripheral device is in an idle state during a predetermined time at step S22. If it is determined that the specific peripheral device is in the idle state at step S22, the monitoring/management unit 190 determines a flag of a corresponding peripheral device to be "1" at step S24, and enters a standby state during a maximum standby state allowable time before blocking a power-supply voltage of the system at step S25. In this case, provided that the corresponding peripheral device is not in the idle state during the predetermined time and is actually used, the monitoring/management unit 190 determines a flag of the corresponding peripheral device to be "0" at step S23.

Thereafter, the monitoring/management unit 190 determines whether the corresponding peripheral device is not in use during a standby allowable time such as a second period denoted by "Period2", namely, the monitoring/management unit 190 determines whether the flag of the corresponding peripheral device maintains the value of "1" at steps S30 and S31. If it is determined that the flag of the corresponding peripheral device maintains the value of "1", the monitoring/management unit 190 transmits an address of the corresponding peripheral device and a signal including a power-supply control command for blocking a power-supply voltage to the microprocessor at step S33. Otherwise, if it is determined that the flag of the corresponding peripheral device does not maintain the value of "1", the monitoring/management unit 190 determines a flag of the corresponding peripheral device to be "0" at step S32.

The monitoring/management unit 190 determines whether a user manually turns off the power-supply voltage of the peripheral device at step S40. If it is determined that the user manually turns off the power-supply voltage of the peripheral device at step S41, the monitoring/management unit 190 determines the flag of the corresponding peripheral device to be "1" at step S42, and transmits an address of the peripheral device and a signal including a power-supply control command for blocking a power-supply voltage to the microprocessor 170 at step S43.

The monitoring/management unit 190 determines whether no input signal is received from the mouse 11 or the keyboard 12 at step S50, and determines whether the no input signal state is maintained during at least a predetermined time at step S51. If it is determined that the no input signal state is maintained during at least the predetermined time at step S51, the monitoring/management unit 190 determines flags of all peripheral devices to be the value of "1" at step S52, and transmits addresses of all peripheral devices and a signal including a power-supply control command for blocking a power-supply voltage to the microprocessor 170 at step S53.

Contrary to the above-mentioned operations, if the user enters a power-supply recovery command of the peripheral device 30 using menu information, the monitoring/management unit 190 transmits one of the following first to third power-supply control commands. The first power-supply control command selectively or simultaneously recovers power-supply voltages of the peripheral device 30. The second power-supply control command recognizes used state information of the peripheral device 30 in real time, determines whether a specific peripheral device is used, and recovers a power-supply voltage of the corresponding peripheral device. The third power-supply control command determines whether an input signal is generated from the mouse 11 or the keyboard 12, recovers all power-supply voltages of all peripheral devices 30, or selectively recovers only power-supply voltages of unused peripheral devices 30 other than the used peripheral device 30.

However, in the case of a specific peripheral device, for example, a printer or a scanner, an error message occurs when a power-supply voltage is not supplied to a peripheral device at the moment at which the computer transmits a service request to the peripheral device. In this case, if the peripheral device is in a warm-up state, the monitoring/management unit 190 displays a message indicative of a power-supply recovery, instead of the error message, on the computer monitor 20 until the power-supply recovery is finished (e.g., during a device power-supply recovery completion time), such that it allows a user to re-transmit a service request to the above peripheral device.

Method for Controlling Power-Supply Voltage of Peripheral Device Using Microprocessor A method for controlling a power-supply voltage of the peripheral device using the microprocessor will hereinafter be described with reference to FIG. 3. Referring to FIG. 3, if the monitoring/management unit 190 transmits a power-supply control command at step S100, the microprocessor 170 determines the number of responses to the power-supply control command to be "0" at step S110, analyzes a corresponding power-supply control command, and determines whether the analyzed power-supply control command is indicative of a power-supply blocking command at step S120. If the corresponding power-supply control command is determined to be the power-supply blocking command at step S120, the monitoring/management unit 190 analyzes a signal received from the interface unit 120 to recognize a peripheral device, a power-supply voltage of which is to be controlled, and controls the individual drive signal generator 180 to switch off the switch 141 of the switching unit 140 connected to the socket 101 to which a corresponding peripheral device is connected, such that it blocks a power-supply voltage from being applied to the peripheral device connected to the socket 101 at step S130. If the microprocessor 170 analyzes a corresponding power-supply control command, and determines the analyzed power-supply control command to be a power supply command at step S140, it controls the individual drive signal generator 180 to turn on the switch 141 of the switching unit 140 connected to the socket 101 to which a corresponding peripheral device is connected, and supplies a power-supply voltage to the peripheral device connected to the socket 101 at step 150. In more detail, the microprocessor 170 receives a power-supply recovery command of the user's peripheral device 30 from the monitoring/management unit 190 via the interface unit 120 on the condition that the peripheral device 30 is powered off, and receives a first power-supply command to selectively or simultaneously recover power-supply voltages of the peripheral device 30, such that it selectively or simultaneously recovers the power-supply voltages of the peripheral device 30. Also, the microprocessor 170 recognizes used state information of the peripheral device 30 in real time, determines whether a specific peripheral device is used, and receives a second power-supply control command to recover a power-supply voltage of the specific peripheral device, such that it selectively or simultaneously recovers the power-supply voltages of the peripheral device 30. Otherwise, the microprocessor 170 determines whether an input signal is generated from the mouse 11 or the keyboard 12, and receives a third power-supply control command to recover a power-supply voltage of the peripheral device 30, such that it selectively or simultaneously recovers the power-supply voltages of the peripheral device 30.

The microprocessor 170 detects the amount of load of the peripheral device 30 using the individual load detector 150 as shown in the first period denoted by "Period1" of FIG. 3 at steps S200 and S210, compares the detected load with reference load, determines whether the detected load is less than the reference load at step S220, and blocks a power-supply voltage from being applied to the peripheral device 30.

The microprocessor 170 determines whether a response signal is received from the monitoring/management unit 190 as shown in the second period denoted by "Period2" of FIG. 3 at steps S300 and S310, and determines the presence or absence of at least three response signals at step S320. If the absence of at least three response signal is determined at step S320, the microprocessor 170 returns to step S230, such that it controls the individual drive signal generator 180 to turn off the switch 141 of the switching unit 140 connected to the socket 101 to which the peripheral device 30 is connected at step S230, thereby blocking a power-supply voltage from being applied to the peripheral device 30 connected to the socket 101.

Power-Supply Control Method for Use in Computer Monitor

A power-supply control method for use in a computer monitor using the monitoring/management unit and the microprocessor will hereinafter be described. The monitoring/management unit 190 transmits a power-supply control command to block a power-supply voltage from being applied to the computer monitor 20 when a user enters a power-supply blocking command of the computer monitor 20.

The monitoring/management unit 190 recognizes used state information of the computer monitor 20 in real time, and transmits a first power-supply control command to block a power-supply voltage from being applied to the computer monitor 20 when the computer monitor 20 is in an idle state during a predetermined time. If the user manually powers off the computer monitor 20, the monitoring/management unit 190 transmits a second power-supply control command to block a power-supply voltage from being applied to the computer monitor 20. If an input signal is not received from the mouse 11 or the keyboard 12 during at least a predetermined time, the monitoring/management unit 190 transmits a third power-supply control command to block a power-supply voltage from being applied to the computer monitor 20.

If a screen saver or a monitor-off operation is activated according to monitor power-supply setup information from among power-supply option information of the computer system, the monitoring/management unit 190 transmits a fourth power-supply control command to block a power-supply voltage from being applied to the computer monitor 20. In other words, if the user activates a system power-saving mode or a system protection mode (e.g., a monitor-off function or a screen saver function, etc., contained in a power-supply management program mounted to a computer equipped with the Energy Star logo) using menu information, and selects an input power-supply blocking function of the computer monitor 20, the monitoring/management unit 190 completely blocks an input power-supply voltage from being applied to the computer monitor 20 in the system power-saving mode or the system protection mode.

In the meantime, if the microprocessor 170 determines that a user does not use the computer monitor 20 during a long period of time on the basis of information received from the sensor 160 and the individual load detector 150, determines that the amount of load is less than reference load because the computer monitor 20 is powered off, or determines that an input signal is not received from the mouse 11 or the keyboard 12 during at least a predetermined time, it blocks a power-supply voltage from being applied to the computer monitor 20.

Contrary to the above-mentioned operations, the monitoring/management unit 190 determines whether an input signal is received from the mouse 11 or the keyboard 12, recovers a power-supply voltage of the computer monitor 20 if it is determined that the input signal is received from the mouse 11 or the keyboard 12, recognizes used state information of the computer monitor 20 in real time, and recovers the power-supply voltage of the computer monitor 20 according to the recognized state information.

If the user enters a desired input signal using the mouse 11 or the keyboard 12 such that the microprocessor 170 receives the user entry signal from the I/O terminal unit 130, or if the sensor 160 detects the presence of the user, the microprocessor 170 recovers a power-supply voltage of the computer monitor 20. In other words, the microprocessor 170 receives a power-supply recovery command of the user's computer monitor 20 from the monitoring/management unit 190 via the interface unit 120 on the condition that the computer monitor 20 is powered off, and receives a first power-supply command to selectively or simultaneously recover power-supply voltages of the peripheral device 30, such that it recovers the power-supply voltage of the computer monitor 20. Also, the microprocessor 170 recognizes used state information of the computer monitor 20 in real time, determines whether the computer monitor 20 is used, and receives a second power-supply control command to recover a power-supply voltage of the computer monitor 20, such that it recovers the power-supply voltage of the computer monitor 20. Otherwise, the microprocessor 170 determines whether an input signal is generated from the mouse 11 or the keyboard 12, and receives a third power-supply control command to recover a power-supply voltage of the computer monitor 20, such that it recovers the power-supply voltage of the computer monitor 20.

Power-Supply Control Method for Use in Computer

A power-supply control method for use in the computer using the monitoring/management unit and the microprocessor will hereinafter be described. If all peripheral devices 30 are powered off, the microprocessor 170 transmits a first signal indicative of a peripheral device power-off message to the monitoring/management unit 190. The monitoring/management unit 190 directly recognizes used state information of the peripheral device 30 in real time, and may transmit a second signal indicative of a peripheral device power-off message when all the peripheral devices 30 are powered off.

Upon receiving the above-mentioned first signal from the microprocessor 170, the monitoring/management unit 190 monitors state information of the computer 10 on the condition that all peripheral devices 30 are powered off, generates a command for storing all current tasks if the computer 10 is in an unused state, stores the current tasks, and terminates the system. In this case, the monitoring/management unit 190 turns off an HDD or activates a system standby mode according to power-supply option information of a computer system before the system is terminated. Also, the monitoring/management unit 190 monitors state information of the computer 10 during a predetermined time, and terminate the system if the computer 10 is continuously in the unused state.

Until a predetermined second setup time elapses after all power-supply voltages of the peripheral devices 30 are completely powered off, if one or more peripheral devices are not in use and the computer 10 is in the unused state, the monitoring/management unit 190 may generate a command for storing current tasks, may store the current tasks, and may terminate the system. Also, the monitoring/management unit 190 periodically monitors operation state information of the computer 10, and determines whether I/O signals are not generated during at least a predetermined time. If it is determined that the I/O signals are not generated during at least the predetermined time, the monitoring/management unit 190 may switch a current mode of the system to an HDD-off mode or a system standby mode.

If the system is terminated, the microprocessor 170 recognizes a current state of the computer 10 using a power-supply blocking method equal to that of the peripheral device 30 and the computer monitor 20, such that it blocks a power-supply voltage from being applied to the computer 10. In more detail, the microprocessor 170 recognizes the current state of the computer 10 using a method for recognizing the number of response signals, a method for comparing load quantities, signals received from the mouse and the keyboard, and signals received from the sensor, etc., such that it blocks a power-supply voltage from being applied to the computer 10. In the meantime, the microprocessor 170 may independently use the above-mentioned power-supply blocking method, such that it may perform a system termination function.

Contrary to the above-mentioned operations, if a user enters a desired input signal using the mouse 11 or the keyboard 12 on the condition that the computer 10 is completely powered off such that the user entry signal is transmitted to the microprocessor 170 via the I/O terminal unit 130, or if the presence of the user is detected by the sensor 160, the computer 10 receives only the standby power. However, if the computer 10 is completely powered off, even the standby power is not present in the computer 10, such that the system is not powered on although the user presses the power switch (not shown) of the computer 10. In this case, there is a need to recover the standby power of the computer 10, such that only the standby power is temporarily supplied to the computer 10 if the sensor 160 determines that the user is seated in the front of a computer desk, or the standby power supplied to the computer 10 is blocked if the sensor 160 determines that the user leaves the above seat.

In the meantime, in the case of using the above-mentioned standby power control device 100, a network-based power-supply control method is made available.

In more detail, if a plurality of systems are contained in a single room and a specific management system is also contained in the same room, the management system may completely block a power-supply voltage from being applied to a plurality of computers and their peripheral devices. Also, the management system transmits a message to the standby power control device 100, which is independently used or is used for every group, such that it may block an input power-supply voltage from being applied to the computer or its peripheral devices connected to the standby power control device 100. The above-mentioned operations may be used to allow schools, companies, or private educational institutes to simultaneously control the power-supply voltages of their computers or peripheral devices.

Also, the standby power control device 100 according to the present invention may be used as a system for automatically controlling a power-supply voltage of the entire building. In more detail, the monitoring/management unit is installed in a central server for a network system, the standby power control device 100 is designed to have a box-shaped high capacity, individual computers, peripheral devices, or computer/peripheral device groups are connected to the standby power control device 100, such that a power-supply management operation and other control operations for the entire building may be made available.

As apparent from the above description, the present invention provides a standby power control device for monitoring state information of peripheral devices connected to a computer and a current state of the computer, and controlling power-supply voltages of the peripheral devices and the computer according to the monitoring result, such that it reduces the amount of power consumed for either an idle time during which a user does not actually use the computer and at least one peripheral device due to his or her mealtime, conference, settlement, and outing, etc. after the computer and the peripheral devices are powered on, or a standby time after the system is terminated, and reduces power consumption of the remaining unused peripheral devices even when one or more peripheral devices are used, resulting in the implementation of complete power-saving effect.

Also, the present invention provides a standby power control device for efficiently reducing the amount of standby power of the computer and its peripheral devices on the condition that the user powers off the computer to leave his or her office or to sleep.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A standby power control apparatus being used in a power control device for controlling a power-supply voltage of a computer system including a computer and a monitor, and controlling power-supply voltages of peripheral devices, the apparatus comprising:
   a power-supply unit for converting a commercial power source to a DC power-supply voltage requisite for the system, and providing individual components with necessary power-supply voltages;
   an interface unit being connected to the computer via a communication line, and interfacing a signal transmitted from the computer;
   an Input/Output (I/O) terminal unit being connected to a mouse and a keyboard of the computer and transmitting input signals received from the mouse and the keyboard to a microprocessor;
   a switching unit for connecting a plurality of switches to a plurality of sockets, respectively, switching the switches according to an external control signal, and recovering or blocking power-supply voltages applied to the sockets;
   an individual load detector for receiving power-supply state information from the switching unit, and detecting load information of the peripheral device on the basis of the received power-supply state information;
   a sensor being mounted to one side of the computer or the monitor, and determining the presence or absence of a user;
   a microprocessor for receiving a first input signal from the computer via the interface unit, a second input signal from the mouse and the keyboard via the I/O terminal unit, and a third input signal from the individual load detector and the sensor, switching the switching unit according to the received first to third input signals, and controlling a power-supply voltage generated from the sockets, wherein said microprocessor transmits only standby power to the computer if the presence of the user is detected by the sensor on the condition that the computer is completely powered off;
   an individual drive signal generator for receiving a control command signal from the microprocessor, and generating a drive signal to switch on or off the switches of the switching unit; and
   a monitoring/management unit for determining whether the computer, the monitor, and the peripheral device are actually used, transmitting a power-supply control command signal to the microprocessor via the interface unit according to the determined result, and being installed in the computer in the form of an application program, such that it provides the user with a variety of administrator setup menus to allow the user to control overall operations of the system using the administrator setup menus, wherein said monitoring/management unit displays a message indicative of a power-supply recovery on the monitor until the peripheral device recovers its power-supply voltage in a warm-up state when recovering a power-supply voltage of the peripheral device.

2. The apparatus according to claim 1, wherein the sockets include designated addresses for every peripheral device such that the microprocessor independently controls the computer, the monitor, and the peripheral device; and the monitoring/management unit includes address information when transmitting the power-supply control command signal to the microprocessor.

3. The apparatus according to claim 1, wherein the monitoring/management unit transmits a first power-supply control command, a second power-supply control command, a third power-supply control command, or a fourth power-supply control command, further comprising:

the first power-supply control command selectively or simultaneously blocks power-supply voltages of the peripheral device when the user enters a power-supply blocking command of the peripheral device;

the second power-supply control command blocks a power-supply voltage from being applied to a corresponding peripheral device on the condition that used state information of the peripheral device is recognized in real time and the corresponding peripheral device is in an idle state during a predetermined period;

the third power-supply control command blocks a power-supply voltage from being applied to a corresponding peripheral device when the user manually powers off the corresponding peripheral device; and the fourth power-supply control command simultaneously blocks power-supply voltages of the peripheral device if an input signal is not received from the mouse or the keyboard during at least a predetermined time, or selectively blocks only power-supply voltages of unused peripheral devices other than the used peripheral device.

4. The apparatus according to claim 1, wherein the monitoring/management unit transmits a first power-supply control command, a second power-supply control command, a third power-supply control command, a fourth power-supply control command, or a fifth power-supply control command, further comprising:

the first power-supply control command blocks a power-supply voltage of the monitor upon receiving a power-supply blocking command of the monitor from the user;

the second power-supply control command blocks a power-supply voltage from being applied to the monitor on the condition that used state information of the monitor is recognized in real time and the monitor is in an idle state during a predetermined period;

the third power-supply control command blocks a power-supply voltage from being applied to the monitor when the user powers off the monitor;

the fourth power-supply control command blocks a power-supply voltage from being applied to the monitor when there is no input signal from the mouse or the keyboard during at least a predetermined time; and the fifth power-supply control command blocks a power-supply voltage from being applied to the monitor if a screen saver or a monitor-off operation is activated according to power-supply setup information of the monitor from among power-supply option information of the computer system.

5. The apparatus according to claim 1, wherein the monitoring/management unit monitors state information of the computer on the condition that the peripheral device is powered off, generates a command for storing all current tasks if the computer is in an unused state, stores the current tasks, and terminates the system.

6. The apparatus according to claim 5, wherein the monitoring/management unit turns off an HDD or activates a system standby mode according to power-supply option information of the computer system before the system is terminated, monitors state information of the computer during a predetermined time, and terminates the system if the computer is continuously in the unused state.

7. The apparatus according to claim 6, wherein the microprocessor blocks a power-supply voltage from being applied to the computer, the monitor, and the peripheral device in the case of the following first to fourth cases, further comprising:

the first case indicates that the computer system is terminated such that the monitoring/management unit does not generate a response signal at least a predetermined number of times;

the second case indicates that an input signal is not generated from the mouse and the keyboard via the I/O terminal unit during at least a predetermined time;

the third case indicates that a detected load is less than reference load when the individual load detector detects the amount of load of the computer, the monitor, or the peripheral device; and the fourth case indicates that the user is not detected by the sensor during at least a predetermined time.

8. The apparatus according to claim 1, wherein the microprocessor boots the computer or recovers a power-supply voltage of the computer, the monitor, or the peripheral device, if the user enters an input signal using the keyboard or the mouse and transmits the input signal to the I/O terminal unit on the condition that the computer, the monitor, and the peripheral device are powered off or do not receive their power-supply voltages, or if the presence of the user is detected by the sensor.

9. The apparatus according to claim 1, wherein the microprocessor receives a first power-supply control command, a second power-supply control command, or a third power-supply control command, selectively recovers a power-supply voltage of the monitor or the peripheral device, or simultaneously recovers power-supply voltages of the monitor and the peripheral device according to the received power-supply control command information, further comprising:

the first power-supply control command selectively recovers a power-supply voltage of the monitor or the peripheral device or simultaneously recovers power-supply voltages of the monitor and the peripheral device on the condition that the microprocessor receives power-supply recovery commands of the monitor and the peripheral device from the monitoring/management unit after the monitor and the peripheral device are powered off;

the second power-supply control command recovers a power-supply voltage of a specific peripheral device on the condition that the microprocessor determines whether the specific peripheral device is used after recognizing used state information of the monitor and the peripheral device in real time; and the third power-supply control command recovers power-supply voltages of the monitor and the peripheral device by allowing the microprocessor to determine whether an input signal is generated from the mouse or the keyboard.

* * * * *